INVENTOR.
Edwin H. Land
BY Brown and Mikulka
and
Robert E. Corb
ATTORNEYS

Feb. 20, 1968  E. H. LAND  3,369,467
PHOTOGRAPHIC FLASH APPARATUS

Filed Dec. 24, 1964  2 Sheets-Sheet 2

INVENTOR.
Edwin H. Land
BY Brown and Mikulka
and
Robert E. Corb
ATTORNEYS

United States Patent Office 3,369,467
Patented Feb. 20, 1968

3,369,467
PHOTOGRAPHIC FLASH APPARATUS
Edwin H. Land, Cambridge, Mass., assignor to Polaroid Corporation, Cambridge, Mass., a corporation of Delaware
Filed Dec. 24, 1964, Ser. No. 420,985
14 Claims. (Cl. 95—11)

ABSTRACT OF THE DISCLOSURE

Photographic apparatus employing flash apparatus wherein the amount of light reflected towards the subject to be photographed is varied in relation to the distance between the photographic apparatus and the subject.

This invention further relates to photographic flash apparatus employing consumable photoflash lamps having substantially constant light output and, particularly, to flash apparatus capable of varying the light directed toward a subject being photographed in relation to the distance between the camera and subject.

Photographic flash apparatus including reflectors have been proposed adapted to be coupled with a camera and including means for altering the light directed toward the subject being photographed in accordance with the distance between the camera and subject in order to maintain a predetermined level of illumination at the subject. In apparatus of this type proposed heretofore, this is achieved by varying the distribution and/or the direction of light directed by the reflector toward the subject.

An object of the present invention is to provide photographic flash apparatus including a reflector providing uniform light distribution and means for varying the light directed by the reflector toward the subject substantially without altering the distribution or direction of the light.

Another object of the invention is to provide photographic flash apparatus as described adapted to be coupled with a camera, including sections movable relative to one another for adjusting the focus of the camera for the camera-to-subject distance, and including means for automatically varying the light directed by the reflector toward the subject in response to movement of the camera sections relative to one another.

A further object of the invention is to provide photographic flash apparatus as described in which uniform light distribution is obtained by employing a reflector having three contiguous reflecting surfaces arranged as three sides of a cube and variation in light output is effected by varying the position of a flash lamp relative to the reflector.

Still another object of the invention is to provide photographic flash apparatus of the type described having a simple and inexpensive construction and capable of dependable operation.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Conventional photographic flash lamps used in photography and in the flash gun of the invention are useful only once and generally comprise a glass envelope containing a material such as foil or wire, which burns to produce a light pulse of predetermined brightness and duration and a conductive ignition element or filament for raising the flash producing material to its ignition temperature; and a base of some type including conductors for connecting the filament to a source of electric current. Each particular type of flash lamp is designed to produce a light pulse or flash having a predetermined time-intensity characteristic which is substantially the same for all lamps of that type and cannot be varied. Thus, in order to take pictures at varying camera-to-subject distances with a flash lamp mounted on the camera, it is necessary to vary either the exposure (i.e., duration and/or relative aperture) to compensate for changes in subject illumination; or to maintain subject illumination constant at every distance. Photographic flash apparatus for practicing this latter expedient have been proposed comprising means for varying either or both the direction and distribution of the light from the flash lamp. Obtaining uniform light distribution at the subject is important to good results and is often a very difficult problem which is only made more difficult when the distribution and direction of the light are varied. In the apparatus of the invention, however, the distribution and direction of the light remains constant and only the amount of light (from the lamp) directed by a reflector toward the subject is varied in proportion to distance in order to maintain constant uniform illumination of the subject.

Figure 1:
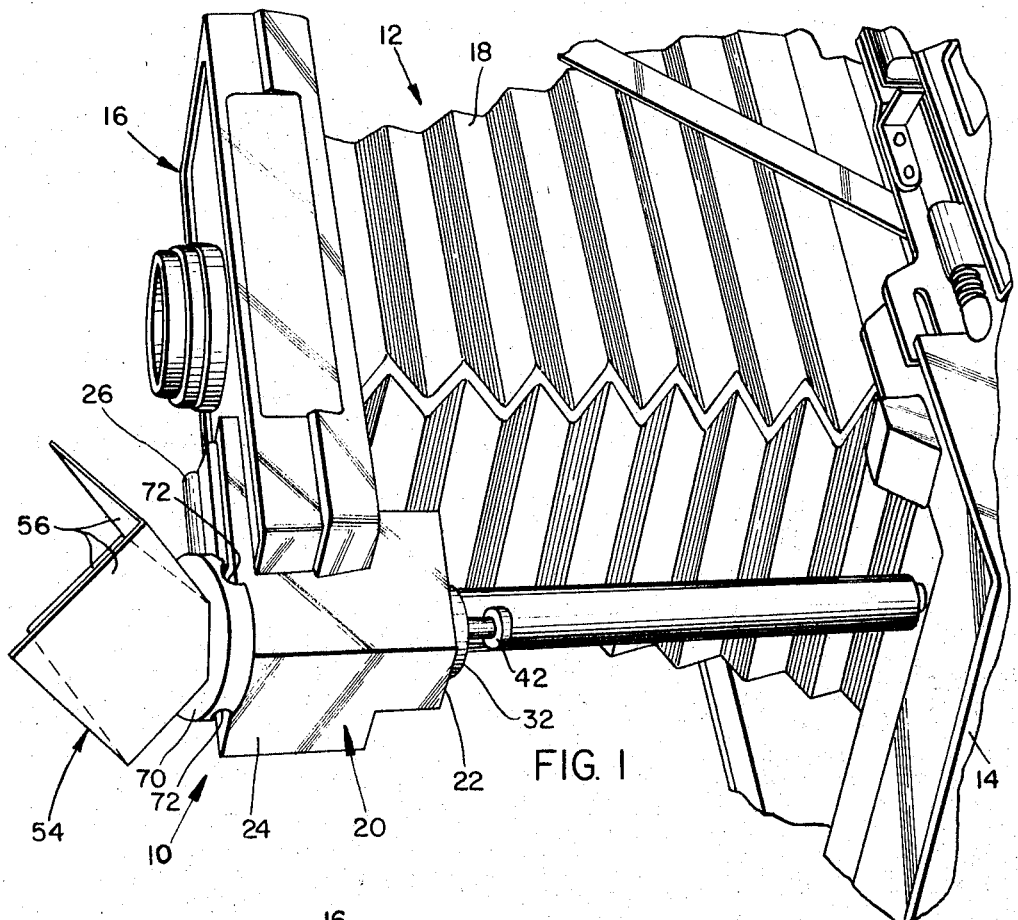
FIGURE 1 is a perspective view showing a photoflash gun embodying the invention operatively mounted on a camera.
Figure 2:
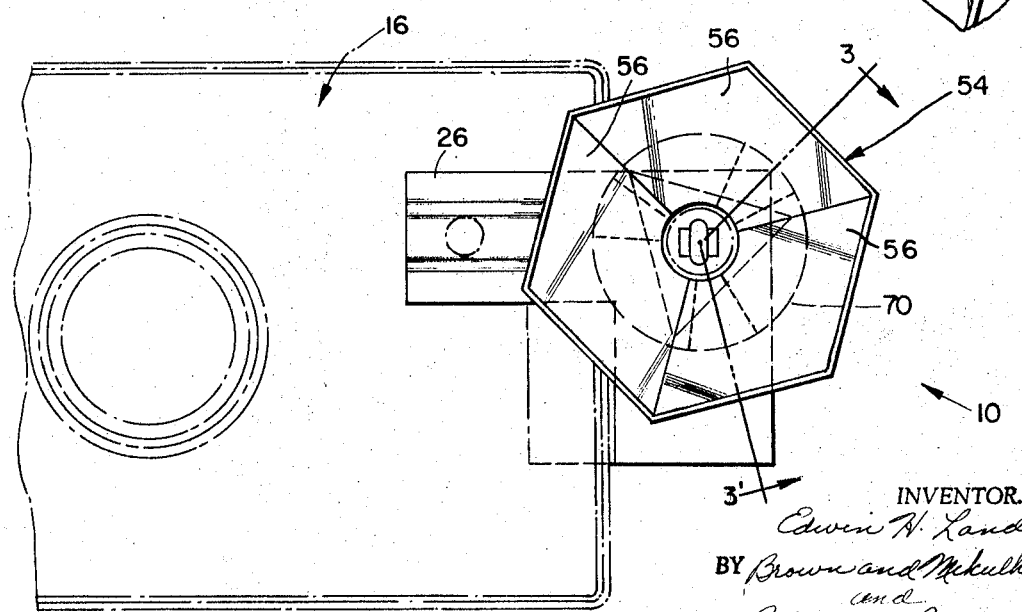
FIG. 2 is a front elevational view of the flash gun with the camera and shutter shown in broken lines.
Figure 3:
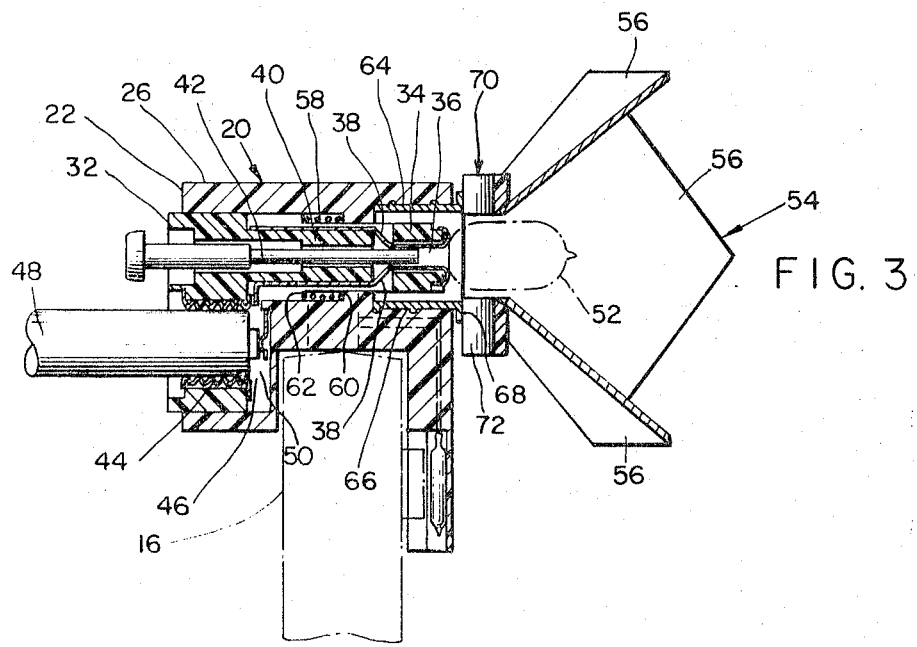
FIG. 3 is a combined sectional view of the flash gun taken substantially along the line 3'-3 of FIG. 2.
Figure 4:
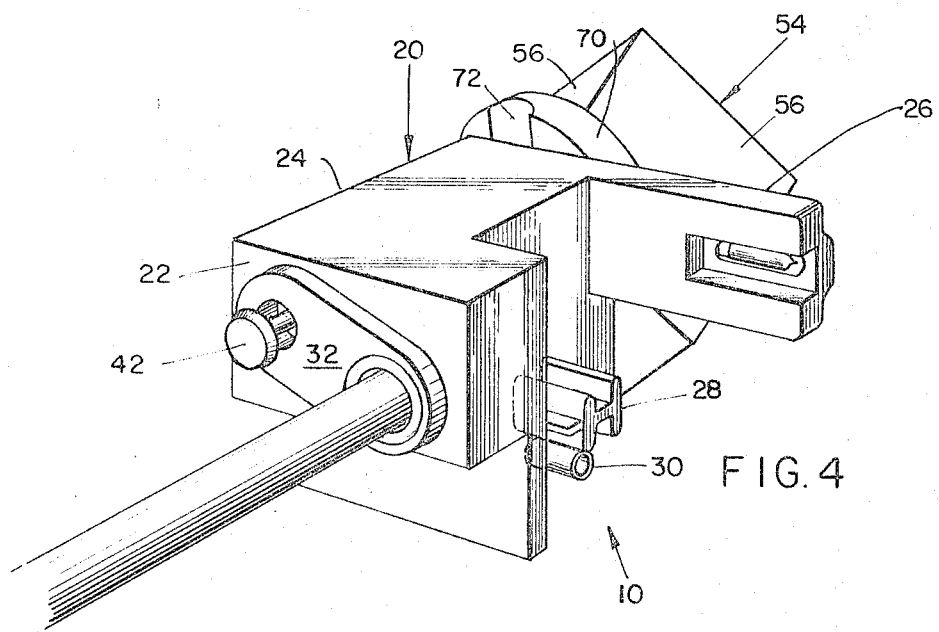
FIG. 4 is a rear perspective view of the flash gun.

Reference is now made to FIGS. 1 through 4 of the drawings wherein there is shown flash apparatus in the form of a flash gun 10 adapted to be mounted on and coupled with a camera 12 of the type comprising a main body section 14 in which the photographic film is supported during exposure, and a section comprising a lens and shutter assembly 16 movable relative to body 14 for focusing the lens in accordance with the camera-to-subject distance. The distance between body 14 and lens and shutter assembly 16 is, of course, inversely proportional to the camera-to-subject distance and the camera includes the necessary means such as a bellows 18 for coupling the lens and shutter assembly to the main body and an erecting system or linkage for supporting and moving the lens and shutter assembly relative to the main body section as required. The flash gun shown is specially designed for use with the self-developing camera of the type sold by Polaroid Corporation, designated "Model 100" and shown in the drawings. This particular camera comprises a shutter mechanism for automatically controlling exposures including a photoresponsive resistor for measuring subject brightness and electrical contacts for completing a circuit between a flash lamp and a source of current, such as a battery, in synchronism with the operation of the shutter. A shutter of this basic type is shown and described in the copending U.S. patent application of David S. Grey, Ser. No. 150,228, filed Nov. 6, 1961, now Patent No. 3,205,795.

Flash gun 10 comprises a housing 20 for mounting and enclosing components of the flash gun and coupling the flash gun with the lens and shutter assembly of the camera. Housing 20 may be of a generally rectangular configuration and includes a rear section 22, a side section 24 and a forward or cover section 26 cooperating to define a channel in which a portion of assembly 16 is engaged with cover section 26 extending across a portion of the front of assembly 16 and covering the photoresponsive resistor of the shutter and rear section 22 disposed behind a portion of shutter assembly 16 so that the shutter assembly is gripped between the rear and forward sections preventing relative movement, in these directions, of the shutter assembly and housing 20 of the flash gun. The shutter includes an outlet or jack in a side wall thereof for receiving a plug including two projections 28 and 30 extending from side section 24 of the flash gun and adapted to enter the jack in the shutter assembly in order to couple the electrical circuit of the flash gun, including a flash lamp, to the synchronizing flash contacts of the shutter mechanism. The projections 28 and 30 are similar to those described in the copending U.S. patent application of Richard R. Wareham, Ser. No. 268,998, filed Mar. 29, 1963, now Patent No. 3,205,802, and adapted to retain the flash gun in operatively coupled relation on the shutter assembly as well as changing a functional relation between subject brightness and a corresponding electrical property of the photoresponsive resistor of the means controlling exposure.

Mounted within rear section 22 and side section 24 of the flash gun housing is a support member 32 on which is mounted a flash lamp holder and means including a battery for moving support member 32 relative to the flash lamp housing and the lens and shutter assembly. The flash lamp holder includes an axially recessed and slotted socket member 34 formed with a socket 36 shaped to receive the base of a photoflash lamp, and two electrically conducting strips secured in axial recesses in the outside of socket member 34 and extending into and axially within socket 36 to make electrical contact with the contacts of a flash lamp. The lamp holder shown in the drawings is designed to be used with AG-1 type flash lamps having a relatively short narrow glass base with two wires protruding therefrom and an elongated and generally cylindrical envelope containing the flash-producing material. The material comprising socket member 34 as well as that comprising support member 32, of which the socket member may be an integral portion, is non-conductive and preferably an organic plastic adapted to formation by conventional casting or molding processes; and conducting strips 38 are preferably formed of metal and include U-shaped ends which extend beyond the forward open end of socket 36 and are engaged in recesses in the end of the socket member adjacent the socket. Support member 32 and socket member 34 are formed with an axial bore 40 in which a manually engageable rod 42 is disposed extending into recess 36 for ejecting a flash lamp from the socket.

As a means for powering the flash lamp and also positioning the flash lamp with respect to main body section 14 of the camera, a conductive (metal) threaded shell or socket 44 is mounted in a recess 46 in the rear of flash gun housing 20 for receiving the threaded end of a tube 48 which may either constitute the outer casing of a battery or may contain a battery for firing a flash lamp mounted in socket 36. Socket 44 is connected directly to one of conducting strips 38, and a conductive contact 50 is provided in recess 46 for making the second electrical contact with the battery and is electrically coupled with the other conducting strip 38.

Uniform distribution of light from a flash lamp 52 mounted in socket 36 is obtained with a reflector 54 in the form of half of a hollow cube comprising three planar reflecting surfaces each disposed perpendicularly to the other two and intersecting the other two at three straight lines, the reflecting surfaces being disposed at 45° with respect to the axis of the flash socket and/or lamp mounted therein. The reflecting surfaces, in the form shown, comprise the inner or concave surfaces of three panels 56 which may be rectangular in shape and formed of a relatively thin sheet material. An opening is provided in the reflector at the apex of the panels and lines of intersection through which flash lamp 52 mounted in socket 36 extends from the outside or convex side of the reflector to the inside or concave side of the reflector. Uniform illumination is obtained when the geometric center or axis of the flash lamp, regardless of its shape, is on or coincident with a line, called axis of the reflector, which intersects the lines of intersection of the reflecting surfaces and is disposed at a 45° angle with respect to the reflecting surfaces.

As previously indicated, in the flash lamp of the invention, the distribution and direction of light from the flash lamp reflected by the reflector in the direction of the subject being photographed is kept constant and only the quantum of light reflected toward the subject is varied in accordance with the camera-to-subject distance. Variation in the light output of the flash gun or light reflected by the reflector, is achieved by moving the lamp relative to the reflector along the axis of the lamp and reflector, so that the amount of light directed toward the subject by the reflector is dependent upon the position of the lamp within the reflector and proportional to the amount of the lamp disposed between or in front of the concave side of the reflector in position to illuminate the reflecting surfaces. Of course, light from the rear portion of the lamp not travelling forwardly does not impinge upon the reflector except possibly the outer convex side thereof and is prevented from reaching the subject. The advantage of this system, as pointed out before, lies in the fact that light distribution remains the same as long as the light originates effectively from the axis of the reflector and only the amount of light from the lamp and reflected by the reflector is changed by altering the size of the portion of the lamp seen by the reflector.

In accordance with the invention, the amount of light directed by the reflector toward the subject is varied in direct relation to the distance between the camera and subject so that illumination of the subject remains substantially constant. To accomplish this, the lamp is held stationary with respect to the main body section of the camera while the reflector is moved with the lens and shutter assembly as the position of the latter is altered to focus the lens. For this purpose, support member 32 is mounted within housing 20 for movement forwardly and backwardly along the axis of the reflector and flash lamp socket and is biased rearwardly toward the main body section of the camera by a coil spring 58 engaged around socket member 34 between a shoulder 60 on housing 20 and a shoulder 62 on socket member 34. Support member 32 is retained against movement relative to the main body section 14 by battery tube 48 which extends rearwardly into engagement with the main body section of the camera. By virtue of this arrangement, the position of the flash lamp 52 mounted in socket 36 remains stationary with respect to the main body section of the camera as reflector 54 which is mounted on housing 20 moves together with the lens and shutter assembly to which the flash gun is attached.

The flash gun includes novel means for mounting the reflector and adjusting the position of the reflector with respect to the flash lamp socket to compensate for a particular film speed and/or a particular flash lamp so that the flash gun may, if desired, be used with photographic films having different sensitivities or with flash lamps having different illumination characteristics while still operating to vary the light directed against the subject in accordance with the subject-to-camera distance. These means comprise a threaded socket 64 having an axis coincident with the reflector axis for receiving a cylindrical threaded sleeve 66 including a flange 68 on which is mounted a circular supporting ring 70 to which reflector 54 is secured. Sleeve 66 includes threads on its outer peripihery for engaging the threads in socket 64 and may be rotated to displace the reflector axially with respect to housing 20 on which the reflector is mounted. In this manner the axial position of the reflector may be varied with respect to the lamp and the lens and shutter assembly on which housing 20 is mounted, in order to provide for a predetermined illumination level of the subject at any particular distance; and this illumination level may be selected to be proper for the sensitivity of the photographic film employed in the camera or the particular type of flash lamp used. For example, when a relatively fast film is employed, the reflector is displaced forwardly to reduce the amount of light directed towards the subject and is displaced rearwardly increasing the light when the film is of a relatively slow speed.

Panels 56 comprising the reflector and supporting ring 70 are provided with hemispherical openings 72, preferably three in number, communicating between the inside and outside of the reflector for permitting the escape of heat generated by the flash lamp together with any vapors of the lacquer coating usually provided on the lamp envelopes to prevent shattering thereof and/or modifying the optical (color) characteristics of the light from the lamp. Openings 72, in permitting escape of heat and vapors, function to prevent damage to the lamp socket and reflector due to heat and/or condensation of the vapors of any coating material on the outside of the lamp envelope.

While the reflector shown and described is substantially in the form of one-half of a cube, it should be apparent that other configurations are possible that will provide for uniform illumination and variation in the light reflected without changing light distribution. According to optical principles, such a reflector should be symmetrical about a line or axis and the reflecting surface or surfaces should be generated by a straight line or lines. Conventional photographic flash lamps constitute a three-dimensional light source which provide for uniform illumination and are generally symmetrical about a point or a line which in turn is located on or coincidental with the axis of the reflector. Illumination remains uniformly distributed by moving the lamp relative to the reflector along this axis, in effect, to vary only the size of the source of light directed toward the subject of the reflector.

Although in the preferred flash gun construction shown and described the amount of light directed toward the subject is varied by holding the flash lamp stationary with respect to the main body section of the camera and moving the reflector automatically as the camera is focused, it is equally feasible to hold the reflector stationary with respect to the main body section of the camera and vary the light output by moving the lamp.

The invention thus provides a photoflash gun having a relatively simple and inexpensive construction, yet capable of uniformly illuminating a subject at varying camera-to-subject distances and automatically adjusting the amount of light directed toward the subject as the lens of the camera to which it is attached is focused. The flash gun also includes provision for enabling its use with photosensitive materials of different speeds (sensitivities) and with flash lamps having different light characteristics, both objects being achieved by moving a component of the flash gun to, in effect, vary the size of the source of light directed by the reflector toward the subject.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic flash apparatus adapted for use with photographic apparatus including a lens, a rear section for holding light-sensitive material during exposure to light from said lens and a forward section mounting said lens and movable with respect to said rear section for moving said lens axially with respect to said rear section to focus said lens, said flash apparatus comprising, in combination:

a housing for mounting and enclosing components of said apparatus;

a reflector mounted in fixed position on said housing for directing light toward a subject being photographed including at least three planar reflecting surfaces arranged in a generally pyramidal form with said surfaces intersecting at straight lines intersecting at a point, said reflector having an axis extending through said point and disposed at equal angles with respect to said surfaces;

said reflector being formed with an opening at the apex thereof substantially symmetrical with respect to said axis through which a photoflash lamp is movable;

lamp-holding means for mounting a photoflash lamp within said opening;

support means mounted in said housing for movement relative to said housing and said reflector along said axis for mounting said lamp-holding means;

means for mounting said flash apparatus on said forward section of said photographic apparatus with the axis of said reflector and said lens in substantially parallel relation; and positioning means coupled with said support means for engaging said rear section of said photographic apparatus and maintaining said support means and said lamp-holding means in fixed position relative to said rear section during movement of said forward section and said reflector relative to said rear section.

2. The photographic flash apparatus of claim 1 wherein said positioning means includes spring means for biasing said support means relative to said housing toward said rear section and a spacing member coupled with said support means for engaging said rear section and preventing movement of said support means toward said rear section under the bias of said spring means.

3. Photographic flash apparatus as defined in claim 1 including means mounting said reflector on said housing for movement relative thereto along said axis between predetermined fixed positions.

4. Photographic flash apparatus comprising, in combination:

a reflector for directing light toward a subject being photographed including three planar panels arranged as three adjoining sides of a cube with each of said panels providing one of three reflecting surfaces intersecting with one another at lines meeting substantially at a point and an opening formed in said panels at said point for admitting a flash lamp;

lamp-holding means having an axis extending through said opening at an angle of substantially 45° with respect to each of said surfaces for supporting a lamp extending through said opening to the forward side of the reflector;

said lamp-holding means being mounted for movement along said axis relative to said reflector for changing the extent to which a flash lamp, mounted in said holding means, extends forward of said reflector to vary the amount of light directed by said reflector toward said subject; and a housing and means secured to the rear sides of said panels mounting said reflector on said housing; the last-mentioned means includes vents communicating between said rear and forward sides of said reflector; and said lamp-holding means is mounted on said housing for movement along said axis relative to said housing.

5. Photographic flash apparatus as defined in claim 4 including a housing, and said lamp-holding means and said reflector are mounted on said housing for movement along said axis relative to one another and said housing.

6. Flash apparatus for use with photographic apparatus including an objective lens, a rear section for holding light-sensitive material during exposure to light from said lens, and a forward section mounting said lens and movable with respect to said rear section for moving said lens axially with respect to said rear section to focus said lens, said flash apparatus comprising, in combination:

a body adapted to be mounted on said forward section;

a flash-lamp holder mounted on said body for movement along an axis substantially parallel with said axis of said lens when said body is mounted on said forward section;

a generally pyramidal reflector mounted on said body, said reflector having generally planar reflecting surfaces diverging outwardly from an apex with an opening at said apex for admitting a flash lamp mounted in said lamp holder; and positioning means coupled with said lamp holder for engaging said rear section and maintaining said lamp holder and rear section in substantially fixed relation during movement of said forward section and said reflector relative to said rear section and thereby varying, in predetermined relation to the distance for which said lens is focused, the amount of light directed by said reflector toward a subject being photographed from a lamp mounted in said holder.

7. Flash apparatus as defined in claim 6 wherein said positioning means include spring means for biasing said lamp holder relative to said body toward said rear section and a spacing member coupled with said lamp holder for engaging said rear section and preventing movement of said lamp holder toward said rear section under the bias of said spring means.

8. Flash apparatus as defined in claim 6 including means mounting said reflector on said body for movement relative thereto coaxially with said lamp holder.

9. Flash apparatus as defined in claim 6 wherein said reflecting surfaces comprise the surfaces of three panels each arranged substantially perpendicularly to the others and at an angle of substantially 45° with respect to said axis of movement of said lamp holder with each of said surfaces intersecting the other of said surfaces at lines intersecting at a point line on said axis of movement.

10. Flash apparatus as defined in claim 9 wherein the last-mentioned means mounting said reflector on said body are secured to the sides of said panels opposite said reflecting surfaces and include vents communicating with said opening and opposite sides of said panels.

11. Photographic flash apparatus comprising, in combination:

a reflector for directing an amount of constantly distributed light from a source, toward a subject being photographed, dependent upon the effective size of said source;

lamp-holding means for mounting a flash lamp relative to said reflector in position to illuminate said reflector and function as said source;

means for mounting said apparatus on a focusing camera; and means responsive to focusing of said camera for changing the size of the portion of said lamp illuminating said reflector in accordance with the distance for which said camera is focused.

12. The photographic flash apparatus of claim 11 wherein said reflector includes a reflecting side for directing light toward a subject, a non-reflecting side and an opening from one side to the other; said lamp-holding means are arranged to mount said lamp with at least a portion thereof projecting through said opening from said non-reflecting side to said reflecting side; and the last-named means include means for varying the position of said lamp within said opening relative to said reflector.

13. Photographic flash apparatus comprising, in combination:

a reflector having at least a reflecting surface symmetrical with respect to a line for directing uniformly distributed light toward a subject;

lamp-holding means for mounting a photoflash lamp symmetrically with respect to said line in position to illuminate said reflecting surface by light emitted from at least a portion of said lamp;

means for changing the position on said line of a flash lamp mounted in said lamp-holding means to vary the extent of said portion of said lamp illuminating said reflector and the amount of light directed toward a subject while maintaining substantially constant light distribution;

means for mounting said apparatus on a focusing camera; and means responsive to focusing of said camera for automatically changing the relative position of said reflector and said flash lamp as said camera is focused.

14. Photographic flash apparatus comprising, in combination:

a reflector having at least one reflecting surface generated by a straight line and disposed in symmetrical relation about an axis for directing substantially uniformly distributed light from a lamp located symmetrically with respect to said axis, toward a subject;

lamp-holding means for mounting a photographic flash lamp within said reflector symmetrically with respect to said axis;

means for moving said lamp-holding means and said reflector relative to one another along said axis to vary the amount of light from said lamp directed toward said subject while the distribution of said light remains substantially constant;

means for mounting said apparatus on a focusing camera; and means responsive to focusing of said camera for automatically changing the relative position of said reflector and said flash lamp as said camera is focused.

References Cited

UNITED STATES PATENTS 1,502,072    7/1924    Travis             240—44.2
1,687,347   10/1928    Moru              240—44

JOHN M. HORAN, *Primary Examiner.*

UNITED STATES PATENT OFFICE
CERTIFICATE OF CORRECTION

Patent No. 3,369,467                  February 20, 1968

Edwin H. Land

It is hereby certified that error appears in the above numbered patent requiring correction and that the said Letters Patent should read as corrected below.

Column 5, line 37, for "of", second occurrence, read -- by --; column 8, after line 56, insert the following:

```
1,800,211   4/1931   De Vault -------88-24B
1,996,584   4/1935   Mateuszczik ---240-1.3
2,294,580   9/1942   Skinner--------88-24C27
```

Signed and sealed this 10th day of June 1969.

(SEAL)
Attest:

Edward M. Fletcher, Jr.              WILLIAM E. SCHUYLER, JR.
Attesting Officer                       Commissioner of Patents